(12) United States Patent
Tribout et al.

(10) Patent No.: US 8,156,774 B2
(45) Date of Patent: Apr. 17, 2012

(54) BICYCLE PARTS ANTI-THEFT DEVICE

(76) Inventors: Michel Tribout, Strasbourg (FR);
Frédéric Lacom, Souffelweyersheim (FR)

( * ) Notice: Subject to any disclaimer, the term of this patent is extended or adjusted under 35 U.S.C. 154(b) by 285 days.

(21) Appl. No.: 12/302,832

(22) PCT Filed: May 25, 2007

(86) PCT No.: PCT/FR2007/000880
§ 371 (c)(1),
(2), (4) Date: Nov. 28, 2008

(87) PCT Pub. No.: WO2007/138181
PCT Pub. Date: Dec. 6, 2007

(65) Prior Publication Data
US 2010/0206021 A1    Aug. 19, 2010

(30) Foreign Application Priority Data

May 29, 2006   (FR) ...................... 06 04729

(51) Int. Cl.
*B62H 5/00* (2006.01)
(52) U.S. Cl. .............. 70/233; 70/229; 70/232; 411/128; 411/330
(58) Field of Classification Search ............ 70/225, 70/233, 229–232; 411/910, 911, 326, 330, 411/128
See application file for complete search history.

(56) References Cited

U.S. PATENT DOCUMENTS

| | | | | |
|---|---|---|---|---|
| 121,548 A | * | 12/1871 | Hadwen | 411/128 |
| 451,174 A | * | 4/1891 | Schofield | 411/128 |
| 612,046 A | * | 10/1898 | Mathews | 411/330 |

(Continued)

FOREIGN PATENT DOCUMENTS

DE    296 10 148 U1    8/1996

(Continued)

OTHER PUBLICATIONS

International Preliminary Examination Report dated Dec. 18, 2008 in corresponding international application PCT/FR2007/000880 (6 pages).

(Continued)

*Primary Examiner* — Suzanne Barrett
(74) *Attorney, Agent, or Firm* — Young Law Firm, P.C.

(57) ABSTRACT

An anti-theft device for a bicycle that includes wheels disposed on a front fork and on a rear stay by a nut or bolt system and a saddle tube whose clamping axis comprises a nut or a bolt. The device includes a nut or bolt fitted with at least one ratchet notch; a support washer defining a peripheral surface including a raised portion; a saddle collar or clamp; at least one pin that is configured to move inside at least one guide passage defined in the support washer or the saddle collar or clamp; at least one mobile guided pin, configured to configured to move between first and second positions under the weight and rotation of the device, the first position being one in which the bicycle is in a vertical position stood on its two wheels, in which the device permits the tightening/screwing of the nut or the bolt but prevents loosening/unscrewing thereof, the second position being a position one in which the bicycle is stood upside down on its handlebars and saddle, in which the nut or bolt may freely rotate in both directions around its axis, and a seal configured to protect the mobile guided pins against environmental factors.

18 Claims, 11 Drawing Sheets

U.S. PATENT DOCUMENTS

| | | | | |
|---|---|---|---|---|
| 625,610 | A * | 5/1899 | Smith | 411/128 |
| 630,915 | A * | 8/1899 | Myers | 384/540 |
| 727,019 | A * | 5/1903 | Stewart | 411/93 |
| 1,855,931 | A * | 4/1932 | Washburn | 40/202 |
| 1,931,900 | A * | 10/1933 | McQuaid | 92/258 |
| 2,177,865 | A * | 10/1939 | Collon | 411/128 |
| 2,491,406 | A * | 12/1949 | Zeeb | 285/89 |
| 3,282,316 | A * | 11/1966 | Griswold | 411/326 |
| 4,602,903 | A * | 7/1986 | Wilburn | 411/222 |
| 4,784,555 | A * | 11/1988 | Cantrell | 411/431 |
| 4,897,008 | A * | 1/1990 | Parks | 411/432 |
| 4,938,108 | A * | 7/1990 | Mekler | 81/176.15 |
| 4,971,501 | A * | 11/1990 | Chavez | 411/221 |
| 5,135,330 | A * | 8/1992 | Chen | 403/374.5 |
| 5,180,265 | A * | 1/1993 | Wiese | 411/150 |
| 5,338,142 | A * | 8/1994 | Gonzales | 411/402 |
| 5,813,258 | A | 9/1998 | Cova et al. | |
| 6,010,289 | A * | 1/2000 | DiStasio et al. | 411/174 |
| 6,695,557 | B2 * | 2/2004 | Hove et al. | 411/429 |
| 7,270,509 | B2 * | 9/2007 | Disantis et al. | 411/332 |
| 2003/0019259 | A1 * | 1/2003 | Nicodemus et al. | 70/233 |

FOREIGN PATENT DOCUMENTS

| | | |
|---|---|---|
| EP | 0 853 034 A | 7/1998 |
| FR | 2 879 992 A | 6/2006 |

OTHER PUBLICATIONS

International Search Report in corresponding International Application, PCT/FR2007/000880, dated Oct. 11, 2007.

* cited by examiner

BICYCLE PARTS ANTI-THEFT DEVICE

BACKGROUND OF THE INVENTION

1. Field of the Invention

This invention relates to an anti-theft device for bicycle parts. It is especially adapted to the clamping of wheels by bolting onto the spindle of the wheels or onto the saddle tube clamp or collar of bicycles.

2. Description of the Prior Art

More particularly, in this anti-theft device for bicycle parts, wheels and/or saddle tube, the wheels are held onto the front fork or onto the rear stay by a bolting device attached to a support washer that is positioned on the wheel hub, whereas the saddle tube is held in its recess by a through-bolting device that is attached to the saddle clamp or collar.

Bicycle wheels and saddle tubes (the tube carrying the saddle) are often stolen and this is a real problem for cyclists. In addition to the nuisance the theft of major parts of the bicycle causes, the cyclist is obliged to replace the stolen parts. The theft of these parts of the bicycle is particularly frequent.

To avoid this, a device to prevent the nut and/or bolt being unscrewed may be fitted. The existing devices which attempt to solve this problem are fitted with a normal type of key, and such keys are easy to get hold of, or a coded key with a specific pattern which means that such key must be carried at all times and not lost or mislaid.

To avoid the bicycle being stolen, it is strongly recommended to secure it to a fixed point using a known type of anti-theft device (cables, etc.) generally rings or hoops that are placed at the disposal of cyclists as a fixed point. In this case, the bicycle cannot be laid flat or turned upside down.

The problem for this invention can be defined as how to prevent the wheels and/or the saddle tube from being stolen.

SUMMARY OF THE INVENTION

According to embodiments of the present invention, this problem is remedied by a device which may include at least a support washer or a saddle clamp or collar which engages with a nut or a bolt head. The support washer may be shaped such that when it is fitted onto its support, it cannot be rotated around its axis without the support itself being rotated. One or more guide passages may be provided and each of which may accommodate at least one pin, these passages defining blind holes in the upper part of the support washer or the clamp (the upper part and the lower part of the support washer are defined by a plane that is the same as the axis of the support washer, and for the clamp by the axis of the hole which accommodates the bolt). A nut or a bolt may also be provided, of which the part that engages with the support washer or the clamp, for the bolt or more precisely the head of the bolt, may have a plurality of ratchet notches on their peripheral surface on the axis of the nut or bolt. In its first working position, with the bicycle in its position of use standing on its two wheels, (nut or bolt locked in position), the device is clamped, the reversible means formed by at least one pin blocks and prevents by means of its partial positioning in the ratchet notches the loosening/unscrewing of the nut or bolt, in this same position of the bicycle, the screwing/tightening of the nut or bolt being possible if the latter has not already been clamped. In its second position of use, with the bicycle standing upside down, on its handlebars and saddle, the locking means composed of at least one pin, under the effect of gravity, moves inside its guide passage, thus freeing the ratchet notch and therefore subsequently permitting the loosening/unscrewing of the nut or bolt and the screwing/tightening.

In accordance other features of the device according to the present inventions invention, the anti-theft device applied to the bolt may include for the wheels a thrust washer engaged on the bolt on the opposite side to the head of the bolt, serrated on one side and with a raised portion on its peripheral section, the raised portion being housed between the tips on the end of the fork. The anti-theft device applied to the bolt may include on the clamp a ratchet surface on the end opposite that which accommodates the head of the bolt. The anti-theft device applied to the bolt may include for the wheels and the saddle a nut that is serrated on one face. The serrated ratchet nut may press against the ratchet notches of the thrust washer of the wheels and on the ratchet surface of the clamp of the saddle. The use of the tool required to tighten/screw in may be replaced by one or several raised portions positioned on the head of the nut or the head of the bolt, such as a butterfly or lever type.

BRIEF DESCRIPTION OF THE DRAWINGS

Embodiments of the present inventions will be more clearly understood by means of the following description, which relates to preferred embodiments, provided by way of non-restrictive example and in reference to the appended drawings, in which.

Figure 1:
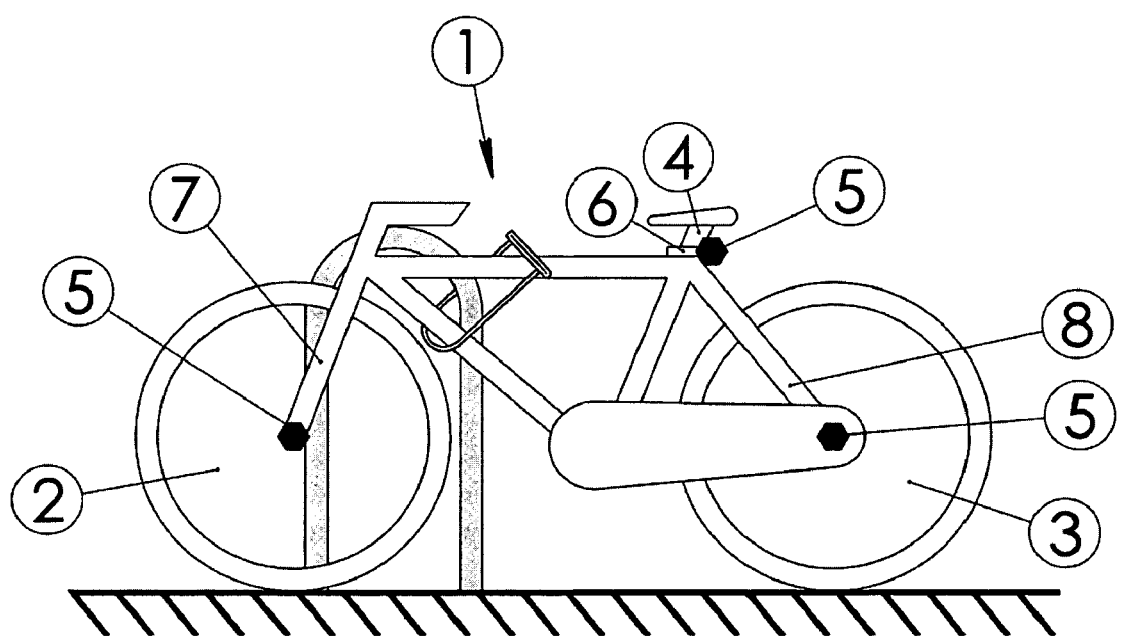
FIG. 1 shows an elevation view of a bicycle in the vertical position with its wheels on the ground, attached to a fixed point and with three nuts and/or bolts locked by the device according to embodiments of the present invention.
Figure 12:
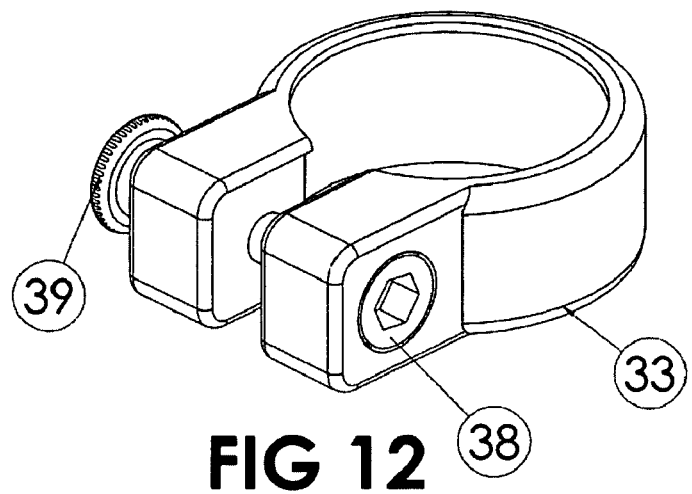
FIG. 12 shows an assembly view of the saddle clamp or collar according to an embodiment of the present inventions.

DETAILED DESCRIPTION 1, wheels 2, 3 and/or saddle tube 4 shown in the figures (FIG. 1, 2) is situated in the support The anti-theft device for bicycle parts washer 10, 20 (FIG. 3, 5, 6, 8, 9, 11, 16, 18, 19) for the wheels and in the saddle clamp or collar 33 (FIG. 12, 13, 14) for the saddle tube 4 as well as in the bolt head 21, 38 (FIG. 8, 9, 10, 12, 13, 15, 18) or the round-section male part of the nut 9, 44 (FIG. 3, 4, 5, 7, 16, 17, 19), and its purpose is to permit or to prevent the bolt 21, 38 or the nut 9, 44 from being unscrewed.

Figure 5:
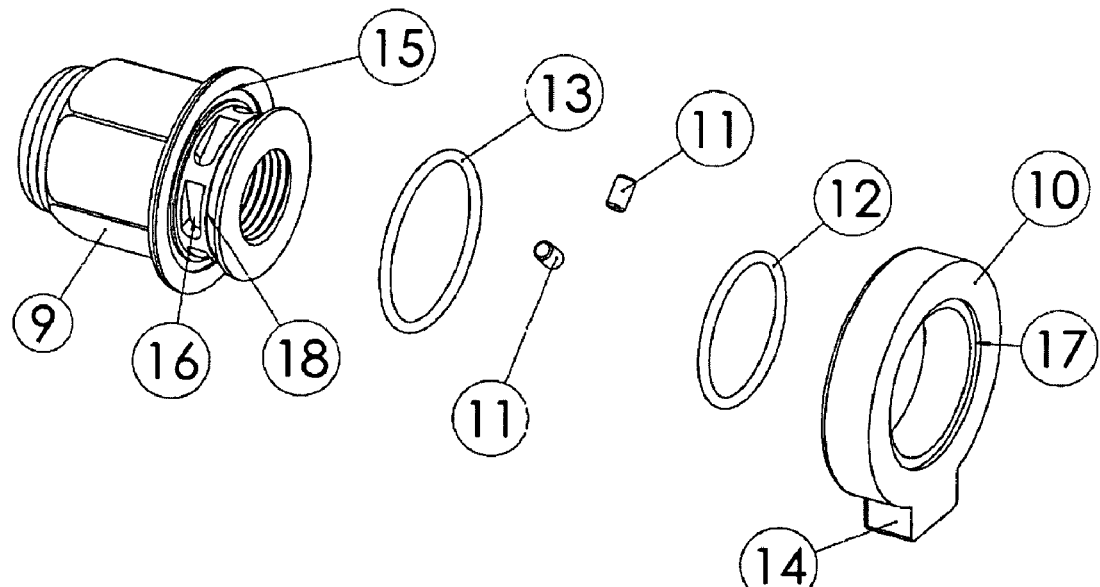
FIG. 5 shows an exploded view of the nut device with the blind nut.
Figure 6:
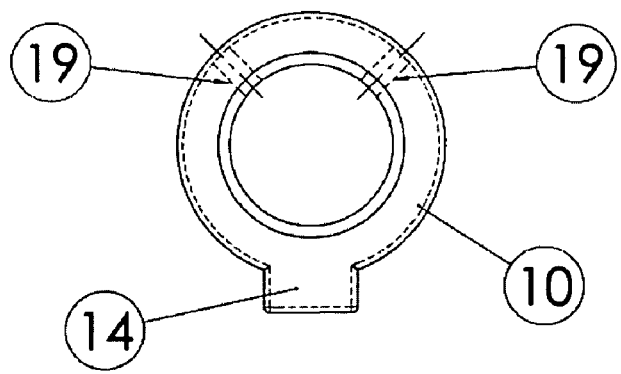
FIG. 6 shows a transparent front view of the support washer 10 of the nut device, according to an embodiment of the present invention.
Figure 7:
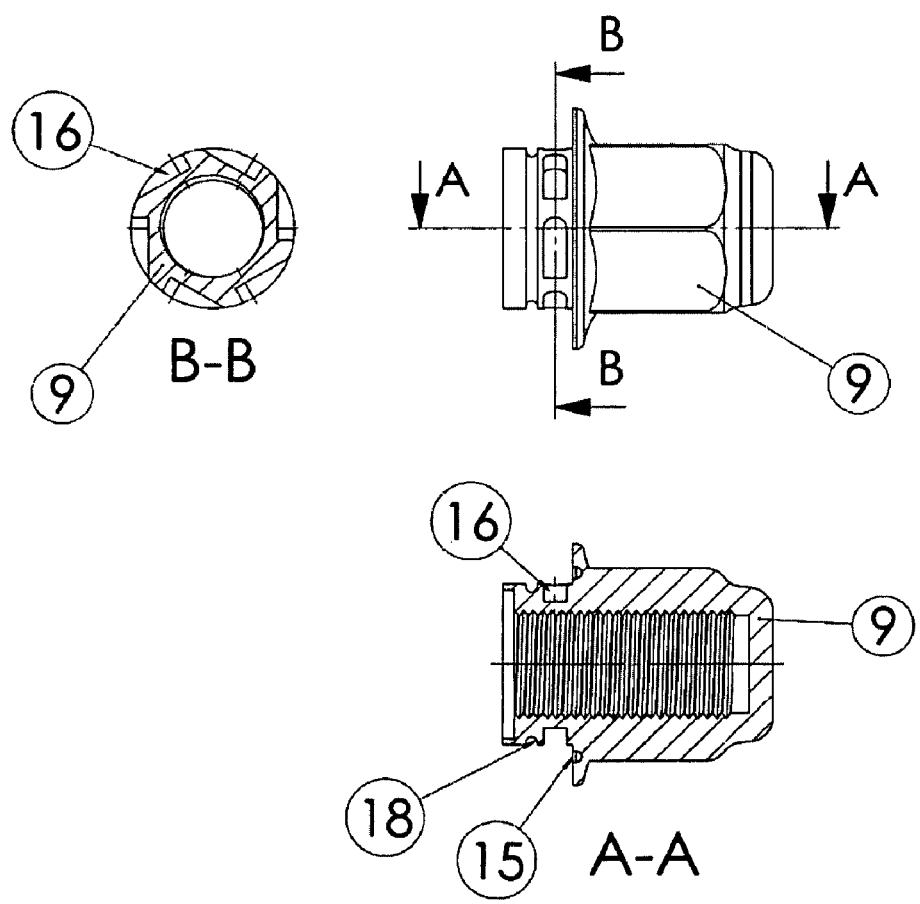
FIG. 7 shows a side view and two cross sectional views A-A and B-B of the blind nut 9 of the nut device.
Figure 8:
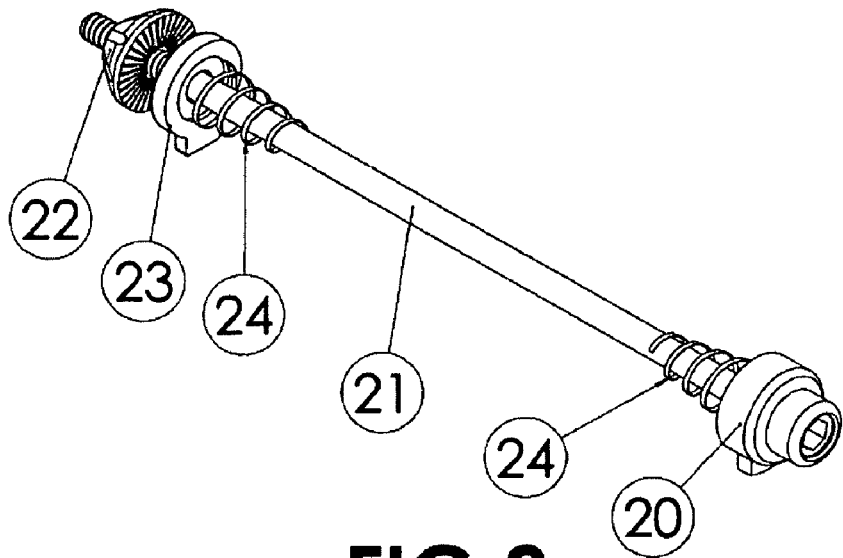
FIG. 8 shows a view of the assembled bolt device, according to an embodiment of the present inventions.

The anti-theft device for bicycle parts may include of one or more guide passages 19, 31, 43 (FIG. 6, 11, 14) that are blind-drilled in the support washer 10, 20 and in the clamp 33 such that they radiate from the axis of the drilled hole designed to accommodate the bolt head 21, 38 or the nut 9, 44. These guide passages 19, 31, 43 may each designed to accommodate one or several pins 11, 27, 36 (FIG. 5, 9, 13), and have a diameter and a depth that are substantially greater than the diameter and depth of the pins 11, 27, 36 that they contain.

The support washer 10, 20 is fitted on its peripheral surface with a raised portion 14, 32 (FIG. 5, 6, 11, 16) that comes into contact with at least one of the tips on the end of the fork so as to prevent it from being rotated around its axis without this causing the rotation of its support. These tips are preferably positioned on the tips of the fork for safety reasons in order to prevent the wheel spindle from coining out of its housing in the tips of the fork themselves in the event of partial loosening.

One or several mobile and free pins 11, 27, 36 move inside the guide passage(s) 19, 31, 43, permitting the screwing/tightening of the nut 9, 44 or bolt 21, 38 and preventing in a specific position the unscrewing of the nut 9, 44 or the bolt 21, 38 and in another position the free rotation of this same nut 9, 44 or bolt 21, 38.

Figure 2:
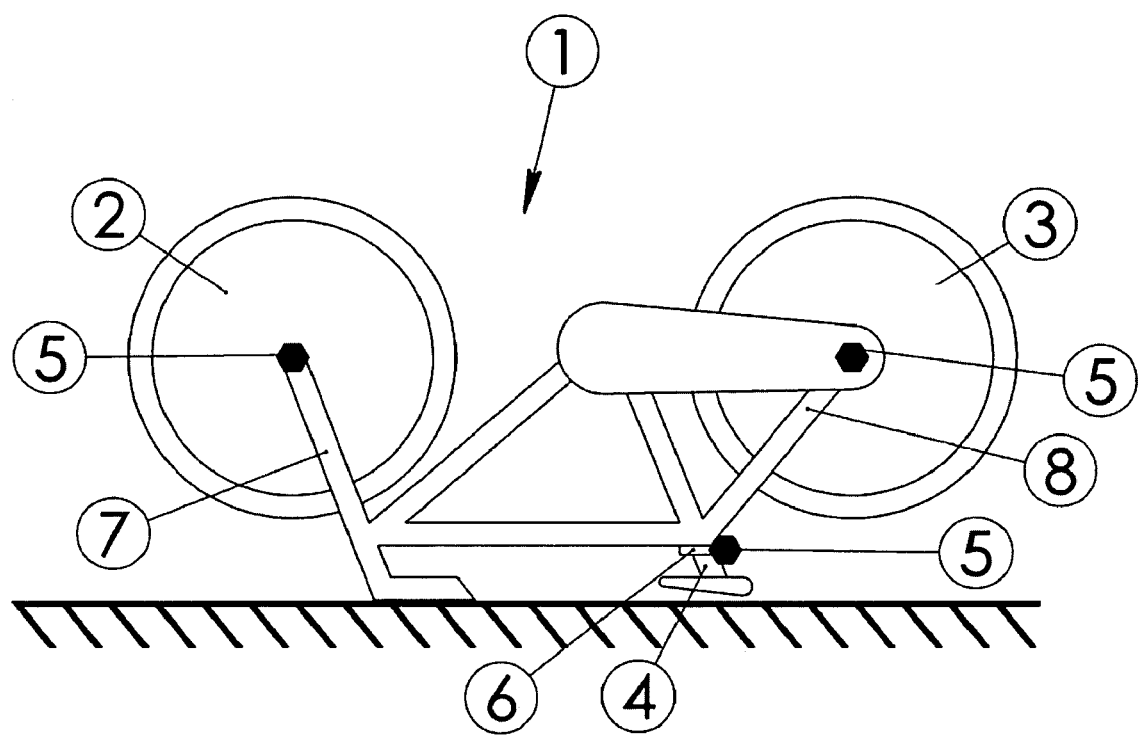
FIG. 2 shows an elevation view of the bicycle of FIG. 1 in an upside down position, resting on the saddle and the handlebars, with the three nuts and/or bolts in an unlocked position.
Figure 3:
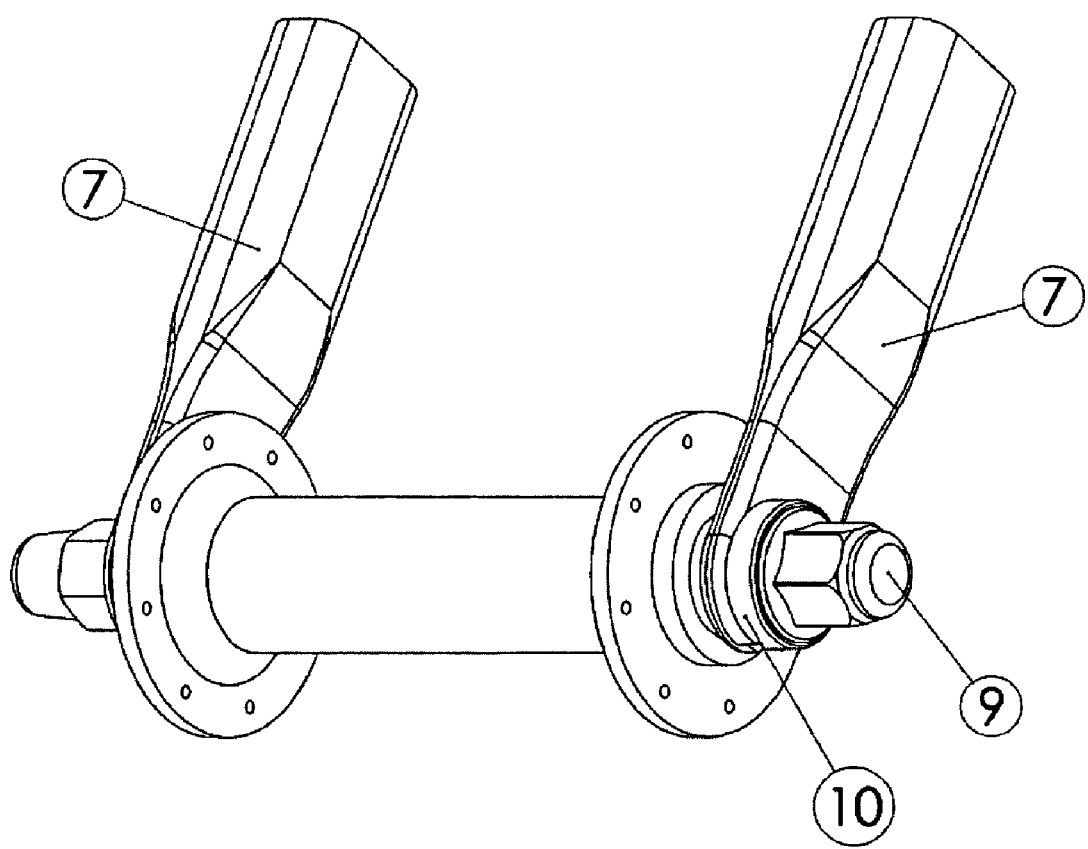
FIG. 3 shows an elevation view of the device according to embodiments of the present inventions on the hub of the fork of the front wheel of the bicycle.
Figure 4:
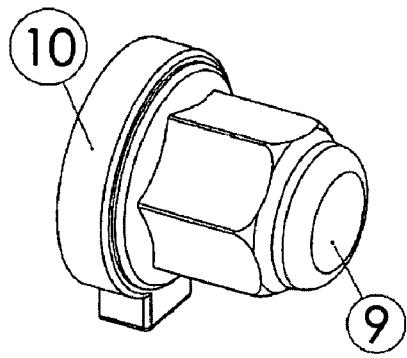
FIG. 4 shows a view of the nut device assembled with the blind nut, according to an embodiment of the present inventions.

The mobile element(s) formed by the pins 11, 27, 36 move inside the guide passage(s) 19, 31, 43 according to whether the bicycle 1 is in its usual position stood on its two wheels 2, 3 (FIG. 1) or turned upside down onto its saddle and handlebars (FIG. 2).

The pin(s) 11, 27, 36 are engaged under the effect of their weight into the ratchet notch 16, 29, 41 (FIG. 5, 7, 9, 10, 13, 15, 17) which is formed by a plurality of grooves preferably formed at regular intervals on the outside face of the bolt head 21, 38 or the outside face of the round section of the nut 9, 44.

These grooves have a variable depth which progressively increases so that it reaches on one of the sides a depth that is sufficient to engage part of the pin 11, 27, 36 and on another of the sides so that it is at the same level as the outside surface of the bolt head 21, 38 or the outside surface of the round section of the nut 9, 44.

To make this clearer, let us consider the two essential positions of the support washer 10, 20 and the two essential positions of the saddle collar or clamp 33 supporting the bolt 38 (FIG. 12, 13, 15):

bicycle 1 in the usual position stood on its two wheels (FIG. 1) and attached to a fixed point by a known anti-theft device, cable, lock, etc. when the nut 9, 44 and/or the bolt 21, 38 are screwed/tightened, the pin(s) 11, 27, 36 are engaged under the effect of their weight into the ratchet notch 16, 29, 41 while partially remaining in the guide passage 19, 31, 43, which makes the nut 9, 44 and/or the bolt 21, 38 stationary with respect to its support washer 10, 20 or the saddle collar or clamp 33 in the unscrewing/loosening direction, thus preventing the unscrewing/loosening of the nut 9, 44 and/or the bolt 21, 38 while permitting the latter to be screwed/tightened further as the rotation on the nut 9, 44 and/or the bolt 21, 38 when screwing/tightening moves the pins 11, 27, 36 from the deepest side of each ratchet to the side that is at the same level as the bolt head 21, 38 or the nut 9, 44 and from one notch to the next.

when the bicycle 1 is in the upside down position on its saddle and handlebars (FIG. 2) the pin(s) 11, 27, 36 can move freely under the effect of their weight in the guide passage(s) 19, 31, 43 to a retracted position, in contact with the blind face of the guide passage(s) 19, 31, 43, a position in which the pin(s) 11, 27, 36 release the ratchet notch 16, 29, 41 entirely snaking it possible to rotate the nut 9, 44 and/or the bolt 21, 38 both in the screwing/tightening direction and in the loosening/unscrewing direction.

Another advantage of embodiments of the present inventions is that in the case of the use of the nut device, it is not necessary to fit each wheel with two anti-theft nuts for the device to be functional, a single anti-theft nut positioned indifferently on either side of the hub prevents the wheel from being removed.

Figure 16:
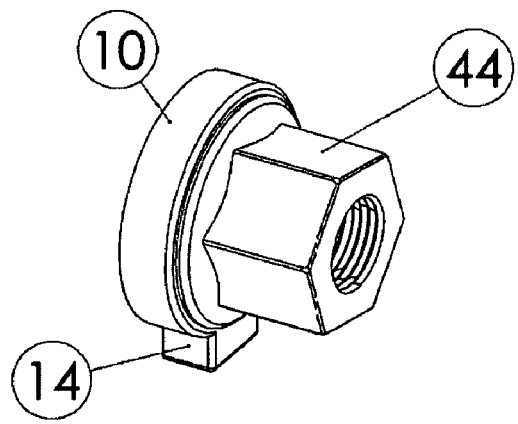
FIG. 16 shows an assembly view of the nut device with the through nut, according to an embodiment of the present inventions.
Figure 17:
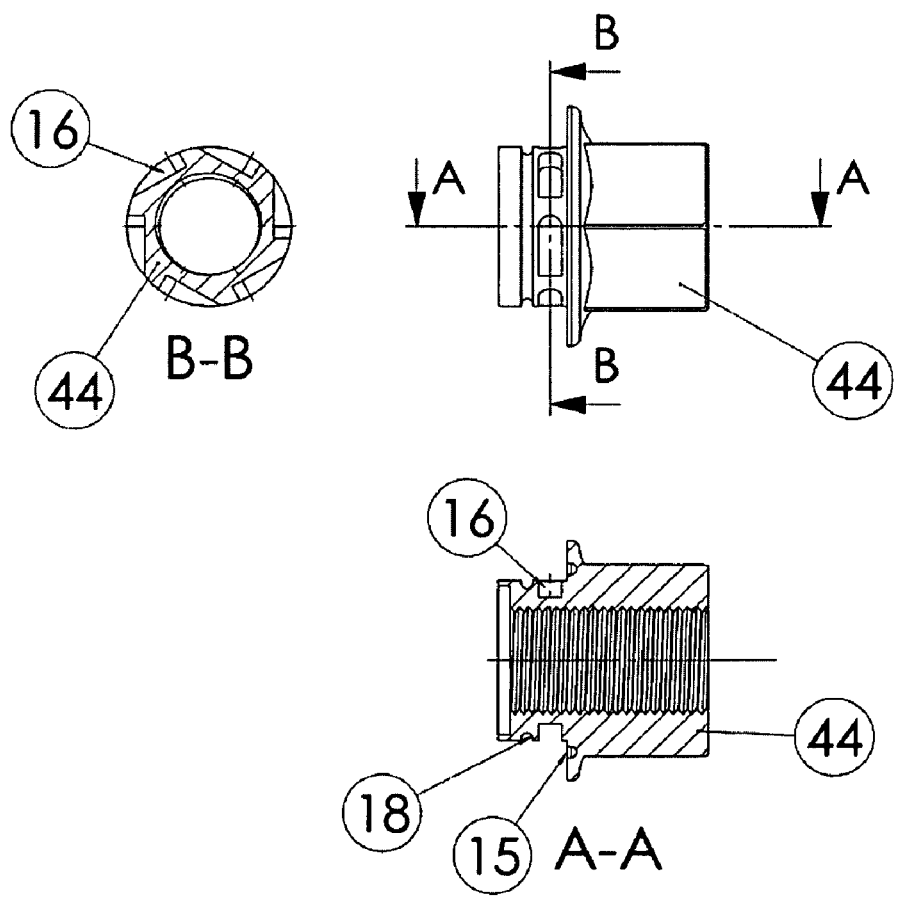
FIG. 17 shows an exploded view of the nut device with the through nut, according to an embodiment of the present inventions.

The nut anti-theft device may be indifferently equipped with a blind nut 9 (FIG. 3, 4, 5, 7, 19) or a through nut 44 (FIG. 16, 17).

In order to be completely effective, the bolt anti-theft device for wheels should be equipped with a nut 22 (FIG. 8, 9, 18) with a ratchet notch radiating out on one of its flat faces, a face which engages with the face with an identical form on the thrust washer 23 (FIG. 8, 9, 18), such that the nut 22 as well as the thrust washer 23 are engaged with the bolt 21 (FIG. 8, 9, 10, 18) on the side opposite the head of this same bolt 21.

The thrust washer 23 positioned between the nut 22 and against the tips of the fork 7 or the tips of the clamp 8 may have on one of its flat faces a radiating ratchet notch which engages with the radiating ratchet notch of the nut 22 and a raised portion 28 which is positioned between the end of the tips of the fork 7 or the end of the tips of the clamp 8.

Figure 9:
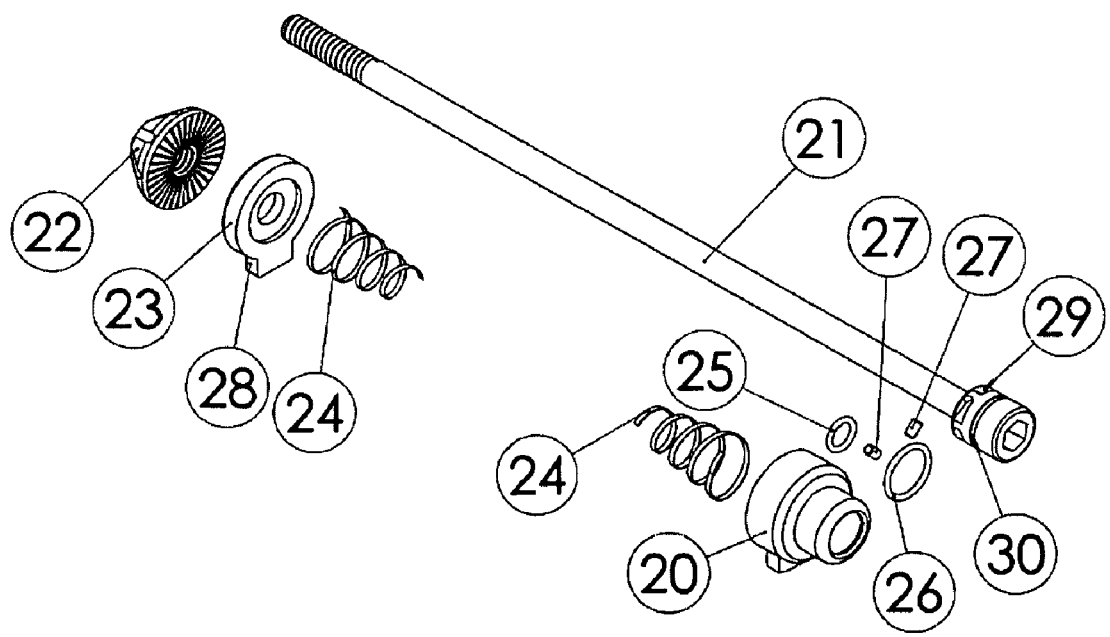
FIG. 9 shows an exploded view of the assembled bolt device, according to an embodiment of the present inventions.
Figure 10:
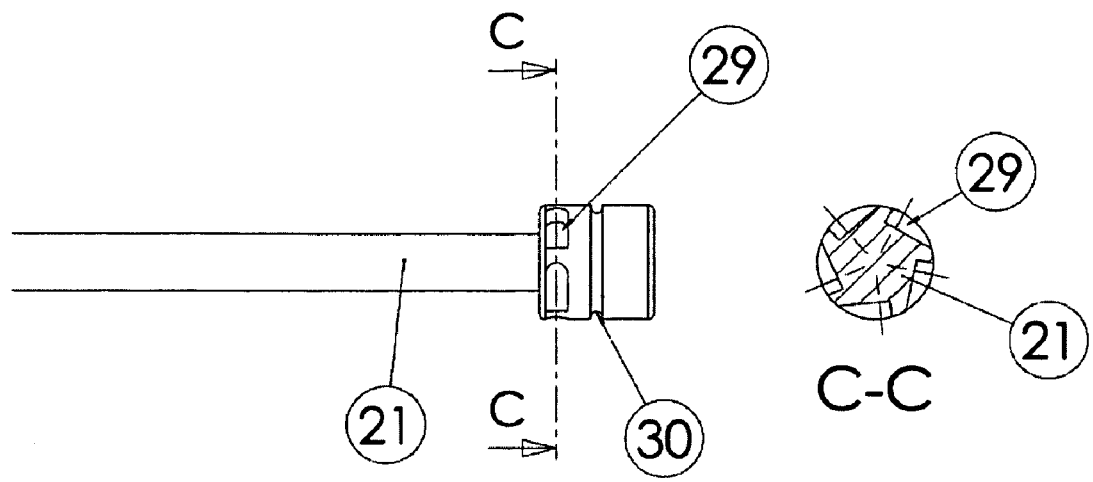
FIG. 10 shows a side view and a cross sectional view C-C of the bolt 21 of the bolt device, according to an embodiment of the present inventions.
Figure 11:
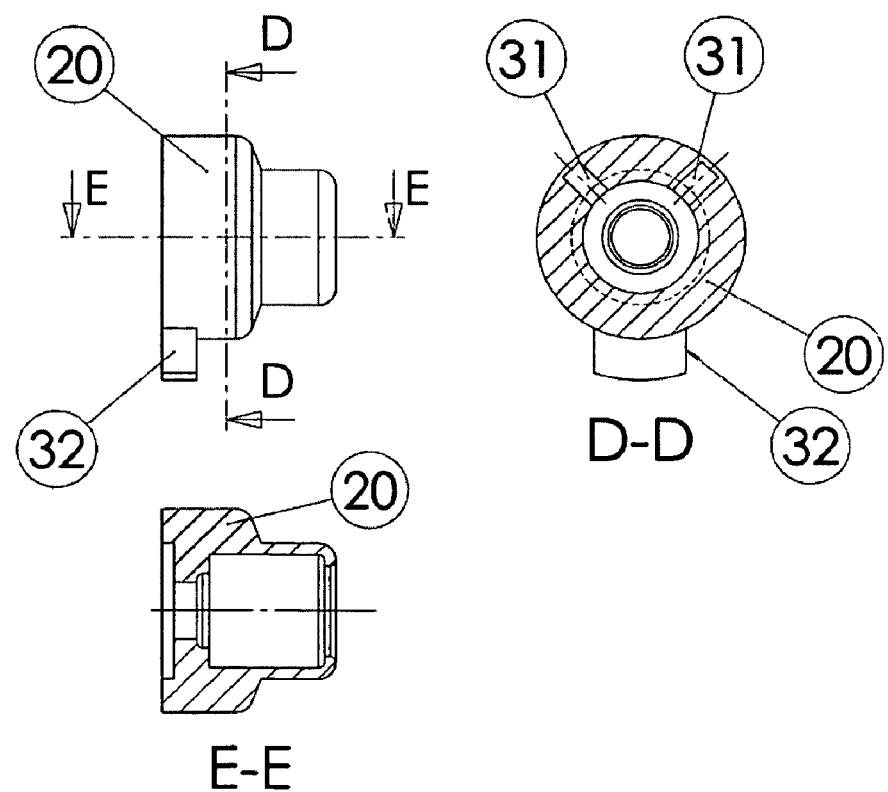
FIG. 11 shows a side view and two cross sectional views D-D and E-E of the support washer 20 of the bolt device, according to an embodiment of the present inventions.

The raised portion 28 (FIG. 9) of the washer 23 permits the rotation of the washer 23 to be blocked.

The radiating ratchet notches of the nut 22 and the washer 23 which engage with one another permit the loosening/unscrewing of the nut 22 to be prevented while permitting the tightening/screwing of this same nut 22 regardless of the position of the bicycle 1.

For the saddle collar or clamp (FIG. 12), a preferred embodiment is that for which the device is equipped with a nut 39 (FIG. 12, 13) with a radiating ratchet notch on one of its flat faces, a face which engages with the notch of identical form on the saddle collar or clamp 33 on the side opposite that which accommodates the head of the bolt 38.

The purpose of the radiating ratchet notch of the nut 39 and the saddle collar or clamp 33 which engage with one another is to prevent the loosening/unscrewing of the nut 39 but to permit the tightening/screwing thereof.

Figure 13:
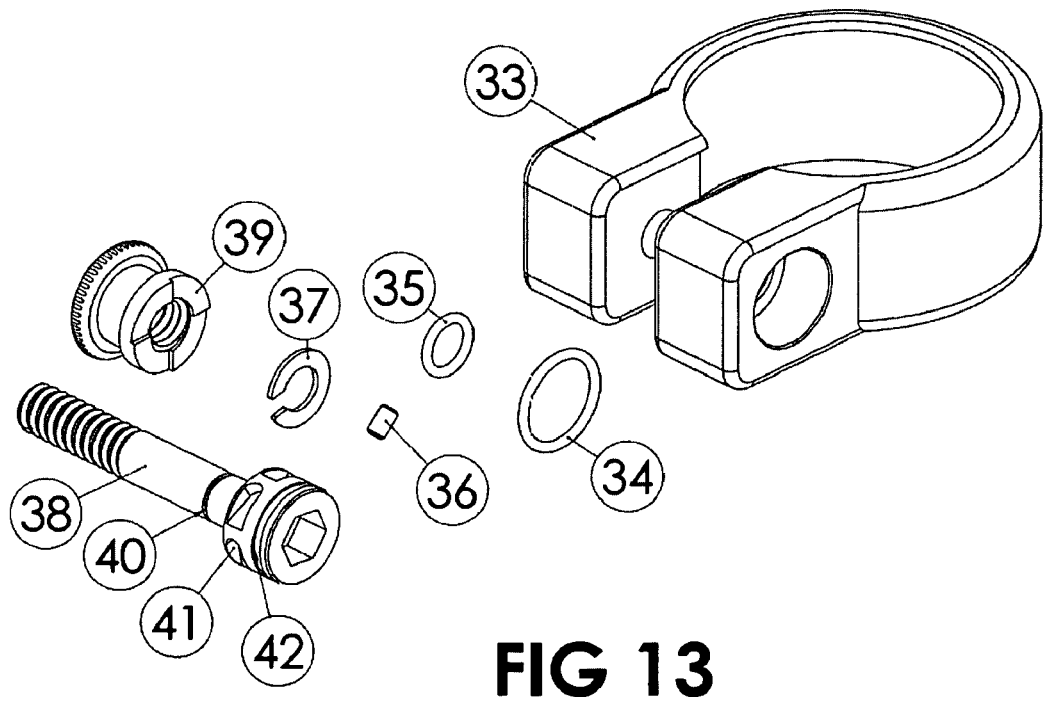
FIG. 13 shows an exploded view of the saddle clamp or collar, according to an embodiment of the present inventions.
Figure 14:
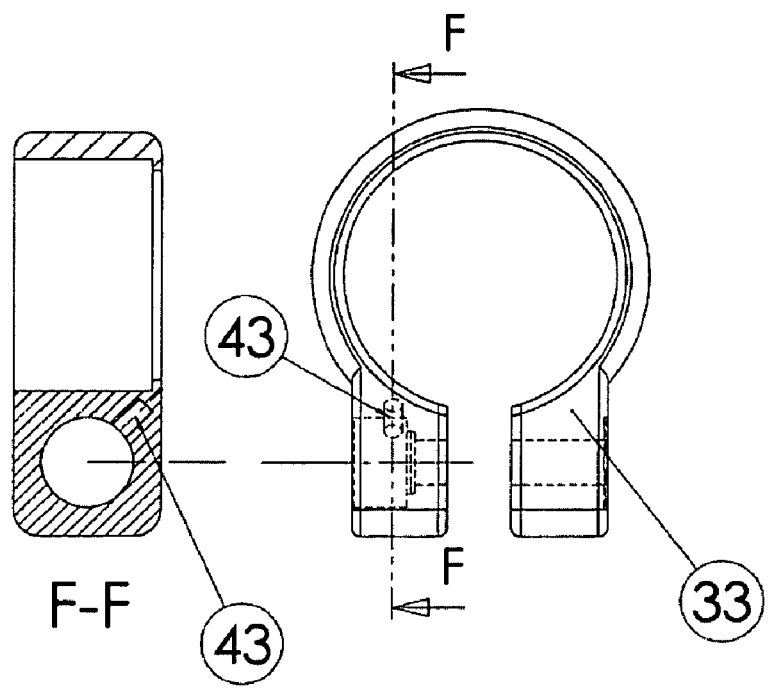
FIG. 14 shows a transparent top view and a cross sectional view F-F of the saddle clamp or collar 33, according to an embodiment of the present inventions.
Figure 15:
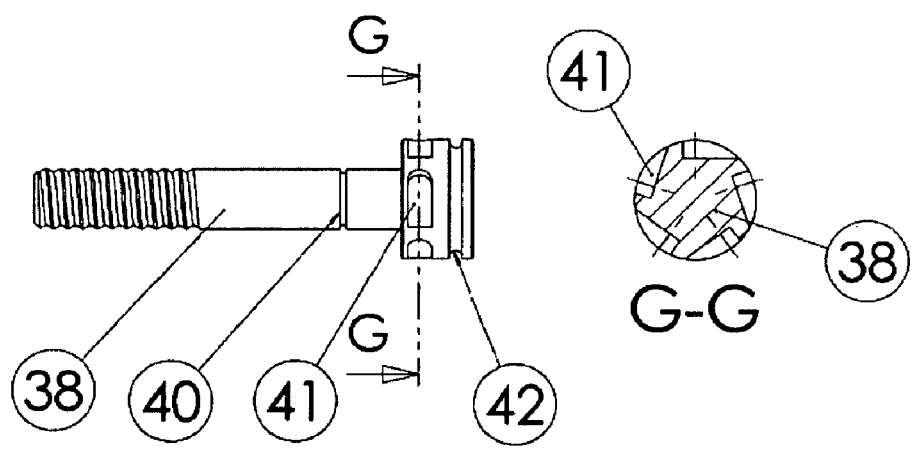
FIG. 15 shows a side view and a cross sectional view G-G of the clamping bolt 38 of the saddle clamp or collar, according to an embodiment of the present inventions.

The bolt head 38 is held in its sheath by means of a retainer 37 (FIG. 13) whose position is in the groove 40 (FIG. 13, 15) on the bolt body 38 and which radiates with respect to its axis.

After assembly the retainer 37 is located on the bolt body 38 at the opening of the saddle collar or clamp 33 pressed against the face of the end of the clamp which accommodates the bolt head 38.

Regardless of the type of anti-theft device, both for the device with a bolt or with a nut, it is preferable to ensure the longevity of the device and the free movement of the pin(s) 11, 27, 36 to position a seal 12, 13 (FIG. 5) 25, 26 (FIG. 9), 34, 35 (FIG. 13) on either side of the ratchet notch, which takes its position in its seal support grove 15, 18, 30, 42 or on the stem of the bolt at the base of its head, in order to protect them against any external factors such as water or dust.

Figure 18:
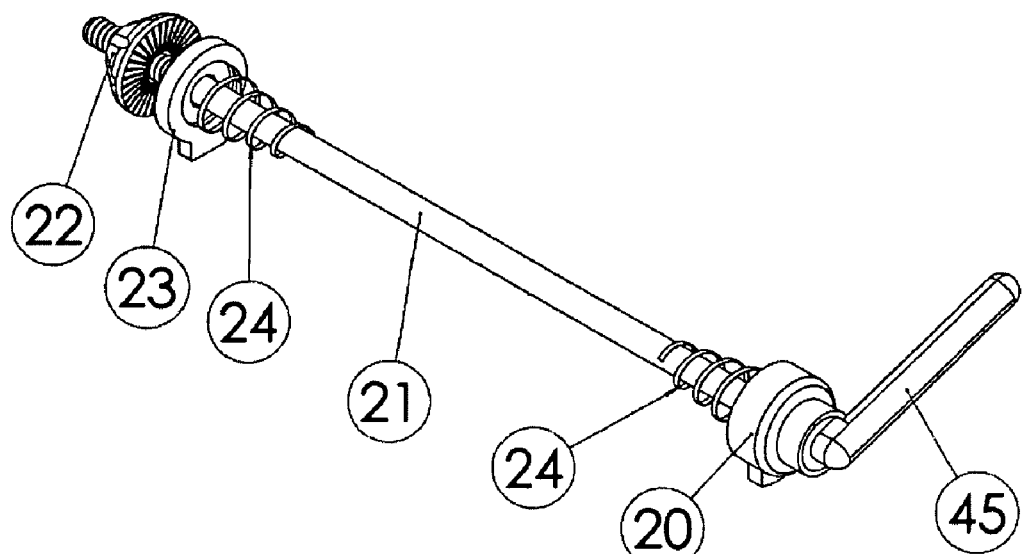
FIG. 18 shows an assembly view of the nut device with a raised portion, according to an embodiment of the present inventions.
Figure 19:
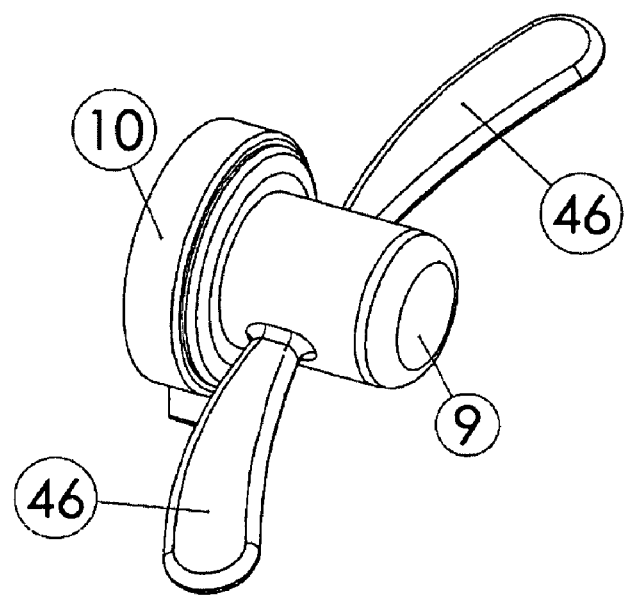
FIG. 19 shows an assembly view of the nut device with two raised portions, according to an embodiment of the present inventions.

The use of the tool required to tighten/screw may be replaced by one or several raised portions 45, 46 (FIG. 18, 19) positioned on the head of the nut 9, 44 or the head of the bolt 21, 38, such as a butterfly or lever type.

REFERENCE SIPS

1. Bicycle
2. Front wheel
3. Rear wheel
4. Saddle tube
5. Nut or bolt
6. Clamp
7. Front fork
8. Clamp
9. Blind nut
10. Support washer
11. Pin
12. Seal
13. Seal
14. Raised portion
15. Seal support groove
16. Ratchet notch
17. Recess
18. Seal support groove
19. Guide passage
20. Support washer
21. Bolt
22. Serrated nut
23. Thrust washer
24. Spring
25. Seal
26. Seal
27. Pin
28. Raised portion
29. Ratchet notch
30. Seal support groove
31. Guide passage
32. Raised portion
33. Saddle collar or clamp
34. Seal
35. Seal
36. Pin
37. Retainer
38. Bolt
39. Nut
40. Groove
41. Ratchet notch
42. Seal support groove
43. Guide passage
44. Through nut
45. Lever
46. Butterfly The sole purpose of the reference signs inserted after the technical features mentioned in the claims is to make them easier to understand and in no way restricts their scope.

Even though the invention has been described in relation to specific structures, it is in no way restricted to them and many variants may be made.

The combinations of the different embodiments shown in the figures or described above are within the scope of the invention.

This anti-theft device for bicycle parts may be applied without restriction to other types of vehicles and used whenever the prevention of loosening/unscrewing is necessary.

What is claimed is:

1. An anti-theft device for a bicycle, the bicycle including handlebars, a saddle, wheels disposed on a front fork (7) and on a rear stay (8) by a nut or bolt system and a saddle tube (4) whose clamping axis comprises a nut or a bolt, the anti-theft device, comprising:
   a nut (9, 44) or bolt (21, 38) fitted with at least one ratchet notch (16, 29, 41);
   a support washer (10, 20) defining a peripheral surface that includes a raised portion (14, 32);
   a saddle collar or clamp (33);
   at least one mobile guided pin (11, 27, 36), each mobile guided pin being configured to move inside at least one guide passage (19, 31, 43) defined in the support washer (10, 20) or the saddle collar or clamp (33), the at least one mobile guided pin (11, 27, 36) being configured to move to and from first and second positions of use under an effect of gravity and rotation of the anti-theft device, the first position of use being a position in which the bicycle is in a vertical position stood on its wheels, in which at least one mobile guided pin is engaged within the at least one guide passage and permits the tightening/screwing of the nut (9, 44) or the bolt (21, 38) but prevents loosening/unscrewing thereof, the second position of use being a position in which the bicycle is stood upside down on its handlebars and saddle, and in which the at least one mobile guided pin moves free from the at least one guide passage and permits free rotation of the nut (9, 44) or the bolt (21, 38) in both directions around its axis, and
   at least one seal configured to protect the at least one mobile guided pin against environmental factors that could hinder a free movement thereof inside the at least one guide passage.

2. The anti-theft device of claim 1, wherein each guide passage (19, 31, 43) is defined as a blind hole in the support washer (10, 20) or the saddle collar or clamp (33) with respect to an axis of a hole designed to accommodate a head of the bolt head (21, 38) or a round section of the nut (9, 44) and perpendicularly with respect to the axis, wherein each guide passage, (19, 31, 43) defines a diameter and a depth that are substantially greater than a diameter and depth of the at least one mobile guided pin (11, 27, 36).

3. The anti-theft device of claim 1, wherein each guide passage (19, 31, 43) is configured to accommodate at least one mobile guided pin (11, 27, 36).

4. The anti-theft device of claim 1, wherein the each mobile guided pin (11, 27, 36) is configured to move freely within the at least one guide passage (19, 31, 43) and is configured to be positioned one of in contact with a blind face of the at least one guide passage (19, 31, 43), and partially in the at least one ratchet notch (16, 29, 41).

5. The anti-theft device of claim 1, wherein a plurality of ratchet notches (16, 29, 41) are defined one of in a head of the bolt (21, 38) and on an outside face of a round section of the nut (9, 44).

6. The anti-theft device of claim 1, wherein the at least one ratchet notch (16, 29, 41) defines a variable depth and wherein an end thereof is at a same level as an outside surface of a head of the bolt (21, 38) or at a same level as an outside surface of a round section of the nut (9, 44), thereby enabling the bolt (21, 38) or the nut (9, 44) to be tightened/screwed regardless of the position of the bicycle (1).

7. The anti-theft device of claim 1, wherein the at least one ratchet notch (16, 29, 41), when the bicycle (1) is in the first position of use, prevents loosening/unscrewing of the bolt (21, 38) or the nut (9, 44) due to a position of the at least one mobile guided pin (11, 27, 36) partially inside the ratchet notch (16, 29, 41) and in the respective guide passage (19, 31, 43), but enables tightening/screwing of the bolt (21,38) as the at least one mobile guided pin (11, 27, 36) moves from a deepest side of each notch to a side thereof that is at a same level as the bolt head (21, 38) or the nut (9, 44) and from one ratchet notch to a next ratchet notch.

8. The anti-theft device of claim 1, wherein the raised portion (14,32) of the peripheral surface of the support washer (10, 20) is configured to come into contact with at least one on an end of the front fork.

9. The anti-theft device of claim 1, wherein the at least one seal is positioned on either side of the at least one ratchet notch (16, 29, 41), at least one seal being configured to protect the at least one ratchet notch (16, 29, 41), the at least one mobile guided pin (11, 27, 36) and their the at least one guide passage (19, 31, 43) against environmental factors that could hinder an operation oldie anti-theft device.

10. The anti-theft device of claim 1 wherein, in the first position of use, each of the at least one guided pins is engaged within a respective one of the at least one ratchet notches while remaining partially within a respective one of the at least one guide passages.

11. The anti-theft device of claim 1 wherein, in the second position of use, each of the at least one guided pins is fully disengaged from each the at least one ratchet notch and engaged within one of the at least one guide passages.

12. An anti-theft device for a bicycle, comprising:
   a nut or bolt fitted with at least one ratchet notch;
   a support washer;
   a saddle collar or clamp, at least one of the support washer and saddle collar or clamp including at least one radially-oriented guide passage therein;
   a mobile guided pin configured to freely move within the at least one guide passage defining a longitudinal axis, the at least one mobile guided pin being configured to move between a first position of use and a second position of use that is displaced along the longitudinal axis relative to the first position of use wherein, in the first position of use, each of the at least one guided pins is engaged with one of the at least one ratchet notches while remaining partially within one of the at least one guide passages and prevents the nut or bolt from being untightened and wherein in the second position of use, each of the at least one guided pins is fully disengaged from the at least one ratchet notch and engaged within one of the at least one guide passages and enables tightening or loosening of the nut or the bolt.

13. The anti-theft device of claim 12, wherein the at least one mobile guide pins assumes the first position of use when the anti-theft device is in a first orientation and assumes the second position of use when the anti-theft device is in a second orientation that is different from the first orientation.

14. The anti-theft device of claim 12, further including at least one seal configured to seal the at least one mobile guided pin from an outside environment.

15. The anti-theft device of claim 12, wherein the at least one mobile guided pin and the at least one guide passages are configured to enable the at least one mobile guided pin to freely move from the first position of use to the second position of use under a force of gravity.

16. The anti-theft device of claim 12, wherein the nut or bolt secures a front wheel of the bicycle to a fork of the bicycle.

17. The anti-theft device of claim 12, wherein the nut or bolt secures a back wheel of the bicycle to a frame thereof.

18. The anti-theft device of claim 12, wherein the nut or bolt secures a saddle tube of the bicycle to a frame thereof.

* * * * *

UNITED STATES PATENT AND TRADEMARK OFFICE
CERTIFICATE OF CORRECTION

| | | |
|---|---|---|
| PATENT NO. | : 8,156,774 B2 | |
| APPLICATION NO. | : 12/302832 | |
| DATED | : April 17, 2012 | |
| INVENTOR(S) | : Michel Tribout and Frederic Lacom | |

It is certified that error appears in the above-identified patent and that said Letters Patent is hereby corrected as shown below:

Column 7, line 37 replace the incorrect "an operation oldie anti-theft device."

with the correct

--an operation of the anti-theft device.--

Signed and Sealed this
Fifteenth Day of May, 2012

David J. Kappos
*Director of the United States Patent and Trademark Office*